(12) United States Patent
Lee

(10) Patent No.: US 7,139,909 B2
(45) Date of Patent: Nov. 21, 2006

(54) TECHNIQUE FOR SYSTEM INITIAL PROGRAM LOAD OR BOOT-UP OF ELECTRONIC DEVICES AND SYSTEMS

(75) Inventor: Van Hoa Lee, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/687,234

(22) Filed: Oct. 16, 2003

(65) Prior Publication Data

US 2005/0086464 A1  Apr. 21, 2005

(51) Int. Cl.
  *G06F 1/24* (2006.01)
  *G06F 9/00* (2006.01)
(52) U.S. Cl. ..................................... 713/100
(58) Field of Classification Search .................. None
  See application file for complete search history.

(56) References Cited

U.S. PATENT DOCUMENTS

| | | | | |
|---|---|---|---|---|
| 6,212,631 | B1 * | 4/2001 | Springer et al. | 713/1 |
| 6,704,840 | B1 * | 3/2004 | Nalawadi et al. | 711/118 |
| 6,972,977 | B1 * | 12/2005 | Urabe | 365/49 |
| 2003/0233533 | A1 * | 12/2003 | Avraham | 713/1 |
| 2004/0025145 | A1 * | 2/2004 | Dawson | 717/129 |
| 2004/0103272 | A1 * | 5/2004 | Zimmer et al. | 713/1 |

OTHER PUBLICATIONS

PowerPC, PowerPC 620 RISC Microprocessor Technical Summary, 1996, pp. 1-33.
PowerPC, Power PC Microprocessor Family: The Programmer's Pocket Reference Guide. http://publib16.boulder.ibm.com/pseries/en_US/aixassem/alangref/fixed_rotate/shift64.htm, Assembler Language Reference, Jun. 28, 2003, pp. 1-13.

* cited by examiner

Primary Examiner—Lynne H. Browne
Assistant Examiner—Fahmida Rahman
(74) Attorney, Agent, or Firm—Duke W. Yee; Thomas E. Tyson; Betty Formby

(57) ABSTRACT

A means for minimizing time for a system/device initial program load (IPL) in a system that will not support instruction prefetching when executing IPL code out of non-volatile memory. The IPL code is organized into a first portion and second portion. The first portion is executed from the non-volatile memory device to configure system memory; the first portion also provides initial control of cache inhibit and cache enable by way of software control. The cache-enabling code is strategically located at a memory page boundary such that the system hardware will disable instruction prefetching in an adjoining page lust past this cache enabling software code. After the first portion of IPL code configures system memory, the second portion is copied into memory through the L2 cache and executed from memory with cache enabled to allow speculative instruction prefetching.

13 Claims, 3 Drawing Sheets

TECHNIQUE FOR SYSTEM INITIAL PROGRAM LOAD OR BOOT-UP OF ELECTRONIC DEVICES AND SYSTEMS

BACKGROUND OF THE INVENTION

1. Technical Field

The present invention pertains to electronic devices and systems, and more particularly to an improved method and apparatus for starting up or booting an electronic device such as a data processing system.

2. Description of Related Art

Many devices in use today include electronics that control the operation of at least some portion of the device. While data processing systems are the traditional types of systems that contain such electronics, electronic control is appearing in many other types of devices such as automobiles, telephones and other types of consumer electronics devices, and even home appliances. These types of devices typically have programming code stored within the device that gets executed when the device is initially turned-on or powered-up. This code, and its execution, may be called many different things, such as a boot-up, power-up, start-up or initial program load (IPL) of the device. Some types of systems, such as personal computers, are notoriously slow in providing a ready state after an initial power-up and IPL of the computer.

Many of today's data processing and other types of electronic controlled systems have different types of memory included therein for use by the system. Non-volatile memory, which maintains the value of data stored therein even when there is no power connected to it, is typically used to store the initial start-up or boot code for a data processing system or electronic controlled device. This start-up or boot code is what is executed by a central processing unit (CPU) or controller of the system or device to perform system initialization. This boot code is maintained in non-volatile memory so that the memory contents are maintained even when power is removed from the system or device.

One particular type of non-volatile memory that is used for such boot code is called flash memory. This type of memory device is generally easy to read from, but requires fairly sophisticated control and sequencing of voltage values on various input/output (I/O) pins in order to write/program data into the device.

Volatile memory, such as dynamic RAM (DRAM), is also traditionally contained in a data processing system or electronic controlled device, and is generally used by the CPU or controller as its main or system memory for reading and writing data using traditional memory access techniques.

When the system/device is first powered-up, the system/device is typically designed such that the CPU or controller will begin execution by accessing a boot-up reset vector at a given memory location which contains the starting address of where to begin program execution or sequencing of boot-up code. This boot-up code, also called firmware or internal code, provides functionality to initialize, test and otherwise set-up various system/device aspects, such as initial hardware configuration, etc. and then load an operating or control system into main memory for subsequent execution. In some types of computer systems, this boot code is also known as basic input and output (BIOS) code. Execution control is then passed from the flash memory to system memory for continuing with system initialization and operation by the operating or control system. The reason for partially booting-up using flash memory programming and then transferring control to continue the boot-up sequence from main system memory is that flash memory is much more expensive than main system memory (which is typically comprised of DRAM memory), and therefore system designers want to use as little flash memory in their designs as possible to hold down on costs. Obviously, the more functionality that is provided by the program stored in flash memory, the larger the size (and associated cost) of flash memory that will be required by the system/device.

Cache memory, which is typically comprised of high-speed static RAM (SRAM) devices, is also generally provided in a data processing system for holding instructions and/or data that are likely to be accessed in the near term by a CPU or controller. Because CPUs/controllers have increased in operating speed at a much faster pace than RAM as technology has progressed, without adequate system design, a CPU/controller could waste much of its time waiting to obtain instructions or data from memory, rather than performing calculations. One of the fastest types of RAM, Static RAM (SRAM), is generally too expensive to use for all of system's memory needs. As a compromise, computers generally come with a relatively small amount of SRAM that is used as cache memory. If a CPU instruction or data stored in cache is required again, the computer can access the cache for the instruction/data rather than having to access the relatively slower DRAM. Since the cache memory is organized more efficiently, the time to find and retrieve information is reduced and the CPU is not left waiting for more information. Many CPUs/controllers have two types of cache: level 1 and level 2. Level 1 (L1) cache has a very fast access time, and is typically embedded as part of the CPU/controller integrated circuit device itself. Level 2 (L2) is typically situated near, but separate from, the CPU/controller and has an interconnecting bus to the CPU/controller. Modern CPUs/controllers may also have both L1 and L2 caches integrated into the devices. Some systems also have a separate instruction cache and data cache.

Prefetching is another technique for improving the overall performance of a data processing system. For example, instead of only reading a next instruction from memory for execution by a CPU/controller, an instruction prefetch unit can monitor the instruction stream being executed by the CPU/controller and make educated guesses as to which instructions stored in main system memory are likely to be executed in the future, and thus should be prefetched into the instruction cache so that they are already there in high-speed cache and ready to be read by the CPU/controller (thus avoiding delays or latency that would otherwise occur if the instruction/data were not fetched until actually being called-for by the CPU/controller). One way to make these educated guesses for instruction prefetching is to monitor the instruction stream for instructions that cause execution to occur non-sequentially, such as a conditional JUMP instruction, and predict which condition will exist when the instruction is actually executed to thereby prefetch any non-sequential instructions in the predicted path. If there are no instructions that would cause the instruction stream to deviate from its current sequential execution, then the next n instructions in the sequentially executed data stream can be prefetched into the instruction cache. These types of instruction prefetching, as well as similar techniques for prefetching of data, are commonly known to many hardware and system designers.

These types of instruction and data prefetching are very common for systems where a program to be executed has been loaded into general usage system memory such as DRAM. However, in certain situations such as when executing boot-up or IPL code out of flash memory, some systems inhibit instruction or data prefetching into cache by running in a cache-inhibit mode. This may occur, for example, if the cache line size is different from the size of an interconnecting bus. By running in a cache-inhibited mode, where instructions and data cannot be cached and prefetched, access latencies occur each time a new instruction or data is accessed and there is a significant impact in the performance of the system. As this cache-inhibit mode is typically done for certain systems when they are executing their boot-up code out of flash or other type of non-volatile memory, the system initial-program load (IPL) or boot-up time is greatly increased. This increase in boot time is not only an annoyance to end-users, but also to test engineers and/or technicians as it increases the time required to boot-up and test a device, thus generally slowing down the overall efficiency for manufacturing such systems and devices.

It would thus be desirable to provide an improved method, apparatus and program product that would mitigate this inability to use a cache for prefetching during system/device IPL or boot-up.

SUMMARY OF THE INVENTION

The present invention provides an improved method, apparatus and program product for decreasing overall time for performing a system/device boot-up or initial program load (IPL) that occurs during system/device power-up or reset. The system/device IPL code or firmware is organized into a plurality of portions, including a first or initial portion and a second or remaining portion. The initial portion contains code to configure system memory, and initially copy itself into the system's L2 cache. This initial portion also provides initial control of cache inhibit and cache enable by way of software control. This initial portion is executed from a non-volatile memory device during the self-copying process, and subsequently executed from L2 cache after the instruction fetching caching is enabled by way of software control to fully configure system memory. The cache-enabling code is strategically located at a memory page boundary such that the system/device hardware will disable instruction prefetching in an adjoining page just past this cache enabling software code. After the system memory is configured by the initial portion of the IPL code, the second portion of the IPL code is copied into memory through the L2 cache and executed from memory with cache enabled to allow both normal and speculative instruction prefetching, thus improving overall system performance during system IPL.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

While the methods and techniques described herein are generally directed to a data processing system having one or more CPUs, those of ordinary skill in the art will recognize that these methods and techniques are similarly applicable to other types of devices having electronic control. In addition, use of the term CPU or central processing unit in the present description should be generally construed to mean any type of processor or controller—whether general purpose or application specific.

Figure 1:
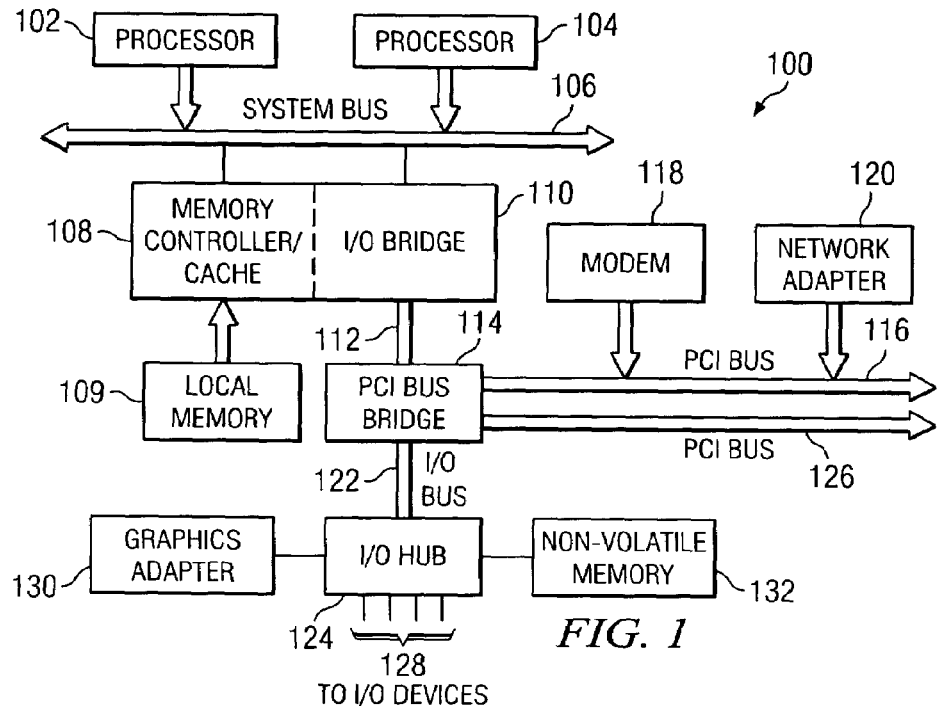
FIG. 1 depicts an overall architecture for a server data processing system.

Referring to FIG. 1, a block diagram of a data processing system is depicted in accordance with a preferred embodiment of the present invention. Data processing system 100 is an example of a server computer system. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local busses 116 and 126. A number of PCI-compliant adapters may be connected to PCI local busses 116 and 126. Typical PCI bus implementations will support four PCI expansion slots or add-in connectors. Communications links to other systems and devices may be provided through modem 118 and network adapter 120 connected to PCI local bus 116 through add-in boards. In this manner, data processing system 100 allows connections to multiple network computers.

PCI bus bridge 114 also provides an interface from the high speed I/O bus 112 to a relatively slower speed I/O bus 122. An I/O hub device 124, such as an AMD 8111 integrated circuit device (available from Advanced Micro Devices of Sunnyvale, Calif.), is connected to this relatively slower speed I/O bus, and provides connectivity to a plurality of I/O devices at 128, a memory-mapped graphics adapter 130, and non-volatile memory 132. Non-volatile memory 132 contains system boot-up or IPL code.

Those of ordinary skill in the art will appreciate that the hardware depicted in FIG. 1 may vary. For example, other peripheral devices, such as hard disk and optical disk drives and the like, also may be used in addition to or in place of the hardware depicted. The depicted example is not meant to imply architectural limitations with respect to the present invention.

The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
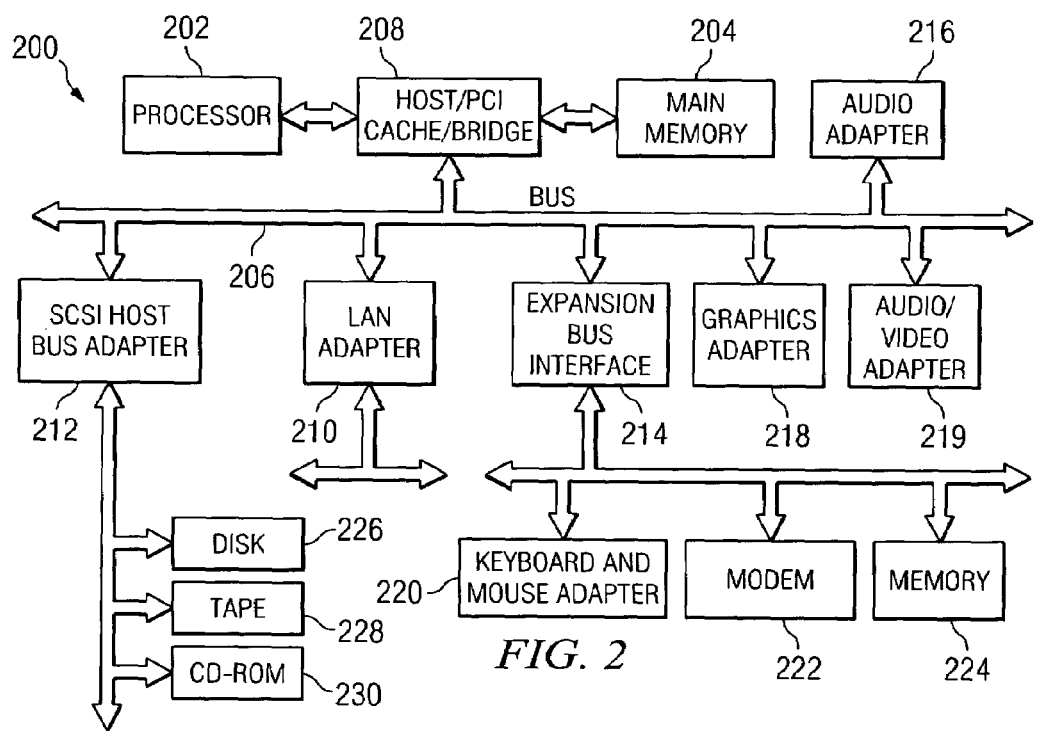
FIG. 2 depicts an overall architecture for a client data processing system.

With reference now to FIG. 2, a block diagram illustrating another data processing system is depicted in which the present invention may be implemented. Data processing system 200 is an example of a client computer system. Data processing system 200 employs a peripheral component interconnect (PCI) local bus architecture. Although the depicted example employs a PCI bus, other bus architectures such as HyperTransport Technology (HT), Accelerated Graphics Port (AGP) and Industry Standard Architecture (ISA) may be used. Processor 202 and main memory 204 are connected to PCI local bus 206 through PCI bridge 208. Main memory 204 includes both volatile memory such as DRAM as well as non-volatile memory such as flash that contains system boot-up or IPL code. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation of Redmond, Wash. An object oriented programming system such as Java may run in conjunction with the operating system and provide calls to the operating system from Java programs or applications executing on data processing system 200. "Java" is a trademark of Sun Microsystems, Inc. of Santa Clara, Calif. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

As another example, data processing system 200 may be a stand-alone system configured to be bootable without relying on some type of network communication interfaces. As a further example, data processing system 200 may be a personal digital assistant (PDA) device, which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3:
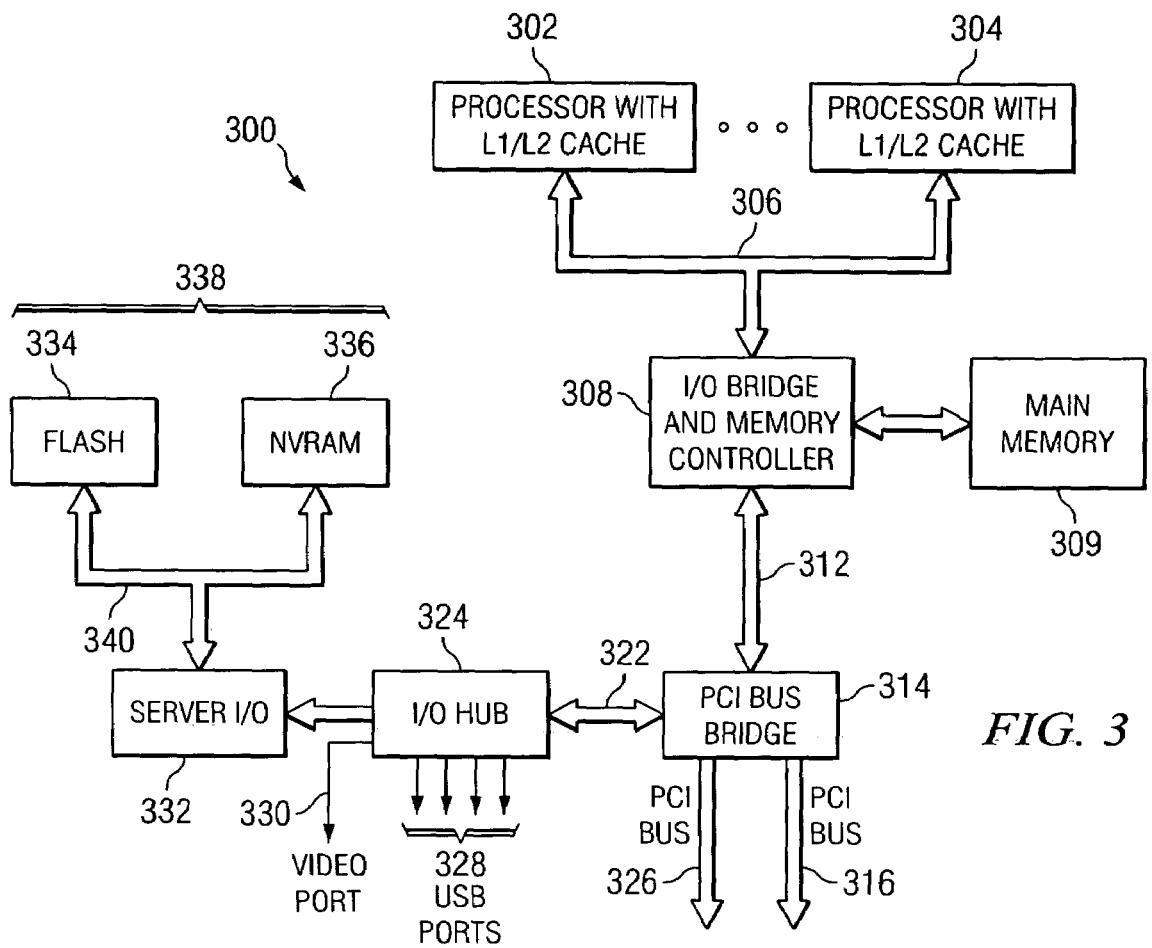
FIG. 3 depicts an architecture of a server data processing system, showing non-volatile memory including flash memory and NVRAM.

Turning now to FIG. 3, there is shown a server system such as that shown in FIG. 1, with further details of the non-volatile memory 132 shown in FIG. 1. One or more processors with associated L1/L2 caches such as 302 and 304 are coupled to an integrated I/O bridge and memory controller 308 via system bus 306. Local or main memory 309 is coupled to this I/O bridge and memory controller 308. Also coupled to this I/O bridge and memory controller 308 via high speed I/O bus 312 is a PCI bus bridge 314. PCI bridge 314 provides a bridge to one or more PCI busses such as 316 and 326, as previously described with respect to FIG. 1. PCI bus bridge 314 also bridges between high speed I/O bus 312 and the relatively slower speed I/O bus 322. In the preferred embodiment, I/O busses 312 and 322 conform to the HyperTransport Technology (HT) protocol. Also coupled to I/O bus 322 is an I/O hub 324 which provides connectivity for a plurality of I/O ports 328 such as universal serial bus (USB) ports, a video port 330 and a server I/O device 332 such as a PC87417 Server I/O device available from National Semiconductor Corporation of Santa Clara, Calif. Server I/O device 332 provides system connectivity to non-volatile memory devices 338 via bus 340, which in the preferred embodiment is an X-bus compliant bus. Non-volatile memory devices 338 include a flash memory 334 used to store IPL or boot-up code, and non-volatile RAM (NVRAM) 336 used to store system configuration information.

A primary focus of the present invention is a technique for managing the power-up, boot-up or initial program load (IPL) of a data processing system such as server computer 300 using program data stored in flash memory 334. These techniques can similarly be used for managing the flash memory used in a client computer such as shown at 200 in FIG. 2 or any other type of control device containing boot-up or other type of IPL code.

Figure 4:
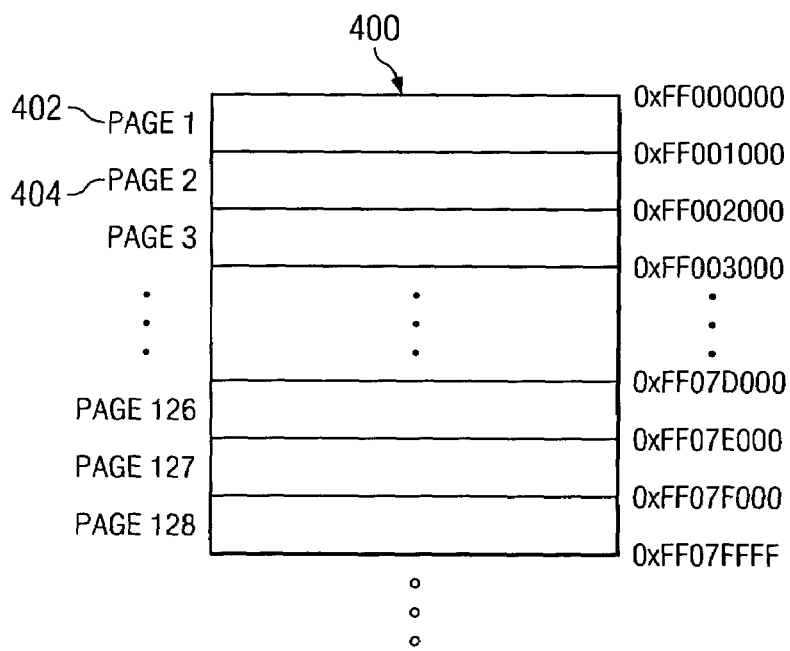
FIG. 4 depicts the internal logical organization of a typical flash memory device.

Turning now to FIG. 4, there is shown at 400 the internal organization of a flash memory device such as flash memory 334 of FIG. 3. In the preferred embodiment, this flash memory device is a 4-MByte memory device organized in a plurality of 4-KByte pages. Thus, there are 1,024 (0x400) pages within device 334 in the preferred embodiment. However, for ease of clarity, only the first 128 pages of the 1,024 4-KByte pages are shown in FIG. 4. The page numbers for the flash device are shown on the left side, and the starting address for each page is shown on the right side. The base address of the flash device in the preferred embodiment is 0xFF000000, which is the starting address of page 1 (shown at 402). Since this device is organized into 4-KByte pages, page 1 extends from address 0xFF00000 to 0xFF000FFF. Page 2 (shown at 404) then starts at address 0xFF001000 and extends to 0xFF001FFF. The remaining pages are similarly organized. While the example depicted in FIG. 4 shows a single non-volatile flash memory device, the methods and techniques described herein are equally applicable to systems and devices having a plurality of non-volatile memory devices for containing their boot-up or IPL code.

Figure 5:
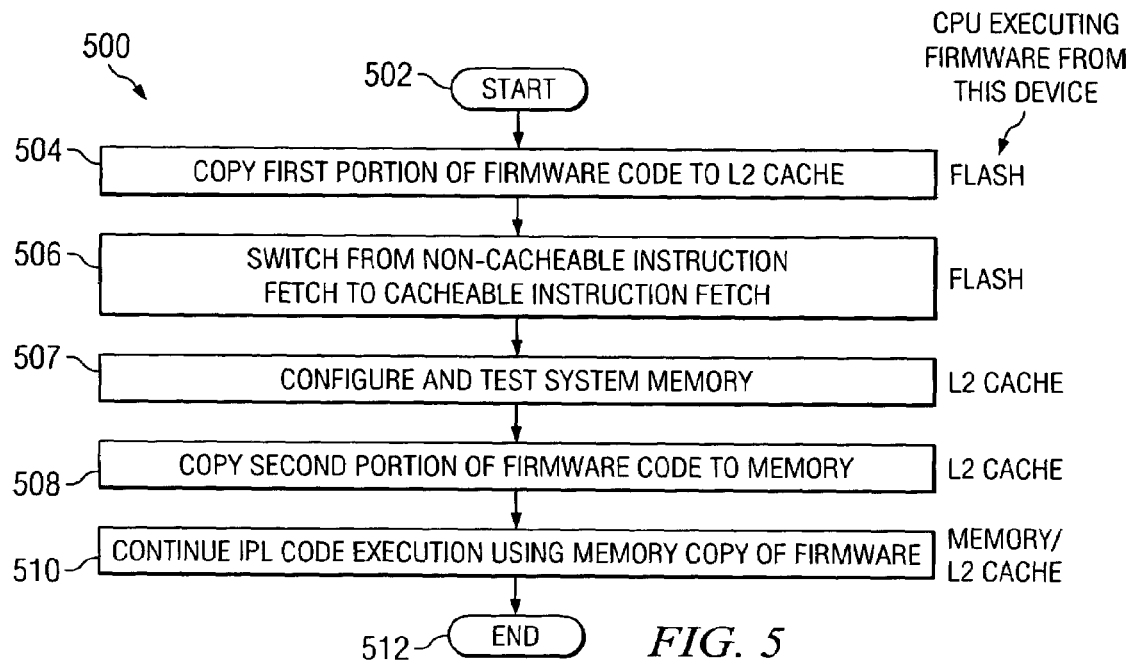
FIG. 5 depicts a high level flow diagram for the improved firmware boot-up technique of the present invention.

A high level flow chart for the improved firmware boot-up technique of the present invention is shown at 500 of FIG. 5. Processing begins at 502, and continues to 504 where a first or initial portion of firmware is copied from the flash device to the L2 cache. This copy operation is executed by the CPU using code stored in the flash device itself (such as element 334 of FIG. 3), as will be further described below. Processing then continues to step 506, where instruction caching and its associated prefetching is enabled. Again, this operation is executed by the CPU using code stored in the flash device itself. A key aspect of the present invention is the physical location of where this instruction cache enabling code is located in the flash device, as will be further described below. For now, suffice it to say that by strategically locating this instruction cache enabling code on a page boundary within the flash device, where the next adjoining page is an un-initialized page in the flash device, the system hardware will override/preempt the software enablement of instruction caching—and thus prevent instruction caching and prefetch—out of this un-initialized adjoining page. Processing then proceeds to step 507, where the first portion of firmware copied to the L2 cache is executed to configure and test the system memory. Processing then continues to step 508, where the second or remaining portion of the firmware stored in the flash device is copied into the system memory. The process is faster by using L2 cache as the intermediate storage because the first portion of code does not have to be copied from flash, and the write-back logic of the L2 cache will decide when it must write the cache lines back to system memory. It should be noted that this copy operation is executed by the CPU using code from the L2 cache device (such code being a part of the initial portion which was copied in step 504). Instruction cache and associated prefetching is now operational because the code being executed is now coming out of the L2 cache which will fetch code/data from system memory as needed, and there are no hardware or system caching issues when executing code out of the L2 cache. Rather, the problem with instruction cache enablement has to due with code execution out of the flash device. Processing then continues at step 510, where the remaining IPL firmware code is executed using the copy which is now completely in the system memory and cacheable into the L2 cache. Firmware execution of the IPL code then ends at 512.

As can be seen, instruction caching is occurring during the processing steps of 508 and 510 of FIG. 5, and is not occurring during the processing of steps 504 and 506 of FIG. 5. Instruction caching is not occurring in step 504 because it is specifically disabled, and it is not occurring in step 506, even though software enabled, due to the physical placement of this instruction cache enablement code immediately adjacent to an un-initialized page in the flash device to thereby force the system hardware to disable instruction caching for this un-initialized page even when instruction caching has been software enabled. It is this synergy between the software and hardware control of cache enablement which is a key aspect of the present invention.

Figure 6A:
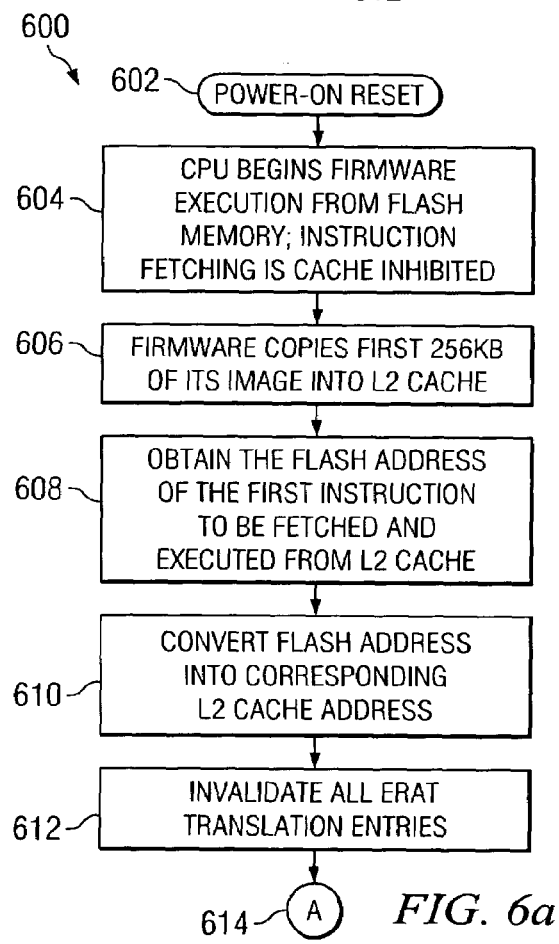
FIGS. 6a–6b depicts a more detailed flow diagram for the improved firmware boot-up technique of the present invention.

Turning now to FIG. 6*a*, a detailed flow diagram depicts the synergistic software and hardware techniques used to improve system performance during system boot-up or IPL. The process starts at 602 with a power-on reset. This may occur as a result of an initial power-up of the system, or as a result of a system reset via either hardware or software. The value of the system reset or initialize vector is used as the address for beginning code execution by the processor, such as processor 102 in FIG. 1. In the preferred embodiment of the present invention, the system reset vector is set to 0xFF000100, and so execution begins at step 604 at this address. Since the flash memory device has been mapped through system design to have a starting address of 0xFF000000, as previously described, execution will begin at offset 0x00000100 (shown at the reset_interrupt_handler label in the code listing in Appendix a). At this point, instruction fetching from cache is disabled (the processor is powered on with the instruction fetching control bit set to 0). The flash firmware is programmed to copy the first 256 Kbytes of its own internal memory contents or image into the L2 cache at step 606. This first 256 Kbytes is also known as the first or initial portion, and contains memory initialization/configuration code as well as instruction cache enabling code. As a part of this copy operation at 606, the flash data is read into sixteen (16) 64-bit general purpose registers (GPRs) in data cache inhibited mode. The contents of the 16 GPRs making up a cache line are then transferred into the L2 cache in data cacheable mode. The detailed operation of block 606 is as follows:

1) Start at the beginning address of the flash image

2) Pick a memory address range to copy into the L2 cache (e.g. 0x00D00000 to 0x00D3FFFF)

3) Turn load/store data cache inhibit ON to inhibit data caching; read one cache line (128 Bytes) from flash image into sixteen 64-bit GPRs 4) Turn load/store data cache inhibit OFF to enable data caching; use dcbz instruction execution to establish a cache line in L2 cache at the selected memory location 5) Store 128 Bytes into this cache line 6) Increment both flash address and memory address by 128

7) Repeat steps 3–6 until the desired firmware portion (e.g. 256 Kbytes) is copied from flash memory into L2 cache Continuing with FIG. 6*a*, after the first 256 Kbytes of the flash image has been copied to the L2 cache, it is time to begin execution of instructions from the L2 cache. This process begins at step 608, where the flash address of the first instruction to be fetched and executed from L2 cache is obtained. This address is then converted to the corresponding address for this instruction in the L2 cache at step 610. All ERAT translation entries are then invalided at step 612 by executing a slbia instruction. ERAT stands for effective-to-real address translation, and ERAT entries are typically used to speed up the translation of effective addresses to real addresses which can be used to access L2 cache or memory. As a required step to enable instruction cache fetching, there cannot be valid ERAT entries in order to avoid a cache-inhibited address hitting an ERAT entry.

Figure 6B:
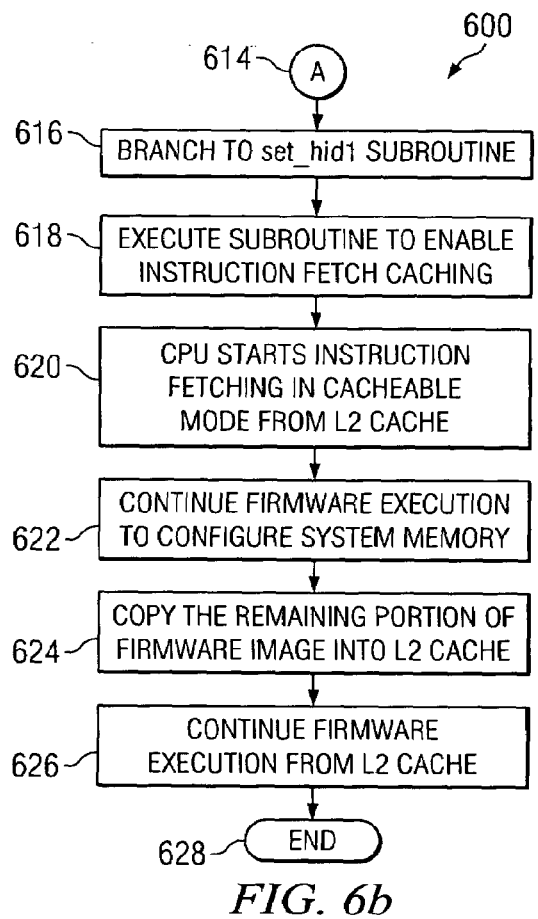

Continuing with exit point A at 614 of FIG. 6*a* which continues to entry point A at 614 of FIG. 6*b*, the algorithm next moves to step 616 where a branch to a routine called set_hid1 occurs. This is a routine that is strategically placed at the very end of a page boundary in flash memory, and the next page that follows this page is intentionally left in an un-initialized state. Step 618 depicts that the instruction fetch cacheable mode is turned on or enabled via software by execution of the set_hid1 routine. The hardware is designed so that once this mode is turned on, the hardware can normally perform speculative instruction fetching. But, by leaving this next page in an un-initialized state, the system hardware will automatically and temporarily disable speculative instruction pre-fetching from this page as it is un-initialized. The effect is that the firmware has prevented the hardware from being placed in a potential hang condition that could otherwise occur if a cache-inhibited device address were used in a cacheable instruction fetch operation. The code at routine set_hid1 (see also, the code listing in the Appendix), which is at the very end of the first page of the flash memory, enables instruction caching by way of software. If this instruction cache enabling software were located in the middle of a page, as soon as it got executed instruction caching would be enabled and the instructions following this cache enabling code would immediately begin to be prefetched into cache. As this code is still being executed out of the flash memory, this enablement of instruction caching would normally cause the system to hang (since instruction caching when executing out of flash memory is not allowed due to hardware constraints). However, since this cache enabling code is located at the very end of a flash memory page, and the next adjacent flash memory page is un-initialized, the CPU hardware prevents speculative instruction pre-fetch caching for this un-initialized page notwithstanding the fact that the instruction caching has been enabled in software.

The final instruction in the set_hid1 routine is an rfid instruction which causes code execution to continue at the next instruction immediately following the instruction that branched to the set_id1 routine (shown in the Appendix at label g_to_cache). The address operand of this instruction has been previously modified by the earlier instructions that obtained the address of the first instruction to execute in L2 cache (step 608–610), such that a branch is made to the appropriate location in L2 cache to continue firmware execution. At this point, instruction caching is successfully enabled per the earlier software enablement in the set_hid1 routine, and any instruction fetch (speculative or normal) caching from now on will be using only cacheable addresses which will hit the L2 cache. The CPU then starts instruction fetching in cacheable mode from L2 cache at step 620 of FIG. 6. Firmware execution of the initial portion copied from flash memory to the L2 cache continues to fully configure the system memory at 622. The remaining portion of the flash image is then copied, still using the copied initial portion code, from flash memory to system memory through the L2 cache as intermediate storage at step 624. Then, since the entire flash image has been copied into the system memory, firmware execution from the remaining portion of the IPL code in system memory which is not entirely cacheable in L2 cache continues at step 626, and ends upon firmware execution completion at 628.

Thus, a method, apparatus and program product have been described which advantageously improves system performance during machine boot-up or IPL. This improved performance is obtained by managing execution of the IPL firmware code, and in particular by executing firmware code from a flash device to the minimum degree necessary to set-up and establish certain operating parameters and copy a first portion of the firmware from the flash device to a cache. Then, after enabling instruction caching from instructions contained within the flash device, boot-up or IPL processing continues using a copy of the firmware in the cache and system memory, allowing for instruction cache enablement during such execution with a resulting increase in system performance during this remaining firmware execution.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, while the preferred embodiment discusses use of L2 cache, the techniques described herein could similarly be utilized in a system or device having a single cache instead of both an L1 and L2 cache. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of initializing an electronic device, comprising the steps of:
   in a system in which instruction caching is unsupported when executing from a first memory, beginning execution of initialization code from the first memory, which is organized as a plurality of pages, to copy a first portion of the initialization code from the first memory into a second memory;
   while executing the initialization code from the first memory, performing a first instruction to software-enable instruction caching, wherein the first instruction is written at the end of a first page of the first memory and the subsequent page following the first page is un-initialized, such that hardware on the electronic device will automatically and temporarily disable instruction caching for the subsequent page that is un-initialized; and
   after execution of the first instruction, executing at least some of the first portion of initialization code from the second memory.

2. The method of claim 1, wherein the step of executing at least some of the first portion of initialization code from the second memory comprises copying a second portion of the initialization code from the first memory into a third memory.

3. The method of claim 2, further comprising the step of executing the second portion of initialization code from the third memory.

4. The method of claim 1, wherein instruction caching is enabled for the step of executing at least some of the first portion of initialization code from the second memory.

5. The method of claim 3, wherein instruction caching is enabled for the step of executing the second portion of initialization code from the third memory.

6. The method of claim 1, wherein the first memory is at least one non-volatile storage device.

7. The method of claim 2, wherein the second memory is cache memory and the third memory is system memory.

8. An apparatus comprising:
   a processor,
   a first memory, which is organized as a plurality of pages, and a second memory, wherein the processor does not support instruction caching when executing from the first memory;
   initialization code including a first portion and a second portion, the initialization code having
      first instructions, executable from the first memory, for copying the first portion into the second memory,
      second instructions, executable from the first memory, for enabling instruction caching for the processor, wherein the second instructions are stored at the end of a first page and a second page immediately following the second instructions is un-initialized, such that the processor automatically and temporarily disables instruction caching for the second page that is un-initialized, third instructions, executable from the first memory, for transferring execution control to execute from the second memory, and fourth instructions, executable from the second memory, for copying the second portion into a third memory.

9. The apparatus of claim 8, wherein the first memory is at least one non-volatile storage device.

10. The apparatus of claim 9, wherein the second memory is cache memory and the third memory is system memory.

11. A computer readable recordable-type medium containing a computer program product, the computer program product having initialization code for initializing an apparatus, the initialization code comprising:

first code, executable from a first memory of the apparatus that does not support instruction caching while executing from the first memory, for copying a first portion of the initialization code from the first memory, which is organized as a plurality of pages, to a second memory;

second code, executable from the first memory, for software enabling instruction caching in the apparatus, wherein the second code is stored at the end of a first page of the first memory and a second page immediately following the first page is un-initialized, such that hardware on the apparatus will automatically and temporarily disable instruction caching for the second page that is un-initialized; and third code, performed after execution of the second code, for transferring execution control to continue execution of the first portion from the second memory with instruction caching enabled.

12. A device comprising:

a non-volatile memory containing initialization code, the non-volatile memory being organized as a plurality of pages, wherein the initialization code is stored in the non-volatile memory such that a first instruction to enable instruction caching is stored at the end of a first page in the non-volatile memory and the page following the first page is un-initialized;

a cache memory;

a system memory; and a processor, connected to the non-volatile memory, the cache memory and the system memory, wherein the processor hangs if instruction caching is attempted while executing from the non-volatile memory;

wherein the initialization code is first executed from the non-volatile memory while a first portion of the initialization code is copied to the cache memory, the first portion of the initialization code is next executed from the cache memory while a second portion of the initialization code is copied to the system memory, and the second portion of the initialization code is finally executed from the system memory;

wherein the storage location of the first instruction provides that instruction caching be software-enabled from the non-volatile memory but be hardware inhibited until execution passes from the non-volatile memory to the cache memory.

13. A method of initializing an electronic device that hangs if instruction caching is attempted while executing from a non-volatile memory, the method comprising:

providing the electronic device with a cache memory; a system memory; and the non-volatile memory that contains initialization code, the non-volatile memory being organized as a plurality of pages, wherein the initialization code is stored in the non-volatile memory such that a first instruction to enable instruction caching is stored at the end of a first page in the non-volatile memory and the page following the first page is un-initialized;

initially executing the initialization code from the non-volatile memory while a first portion of the initialization code is copied to the cache memory;

executing the first portion of the initialization code from the cache memory while a second portion of the initialization code is copied to the system memory; and executing the second portion of the initialization code from the system memory;

wherein the storage location of the first instruction provides that instruction caching be software-enabled from the non-volatile memory but be hardware inhibited until execution passes from the non-volatile memory to the cache memory.

* * * * *